US012737547B2

(12) United States Patent
Serry et al.

(10) Patent No.: US 12,737,547 B2
(45) Date of Patent: Sep. 15, 2026

(54) SEMANTIC TEXT SEGMENTATION BASED ON TOPIC RECOGNITION

(71) Applicant: Microsoft Technology Licensing, LLC, Redmond, WA (US)

(72) Inventors: Mattan Serry, Herzliya (IL); Oron Nir, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 18/507,322

(22) Filed: Nov. 13, 2023

(65) Prior Publication Data

US 2025/0156642 A1 May 15, 2025

(51) Int. Cl.
*G06F 40/30* (2020.01)

(52) U.S. Cl.
CPC .................................... *G06F 40/30* (2020.01)

(58) Field of Classification Search
CPC ... G10L 15/063; G10L 15/1815; G10L 15/22; G10L 25/63; G10L 2015/0635; G06F 40/30
See application file for complete search history.

(56) References Cited

U.S. PATENT DOCUMENTS

| | | | | |
|---|---|---|---|---|
| 9,812,028 | B1 * | 11/2017 | Elchik | G09B 19/06 |
| 10,560,734 | B2 | 2/2020 | Jassin et al. | |
| 10,762,375 | B2 | 9/2020 | Ronen et al. | |
| 10,936,630 | B2 | 3/2021 | Ronen et al. | |
| 2003/0182631 | A1 * | 9/2003 | Tsochantaridis | G06F 16/313 707/E17.084 |
| 2021/0174146 | A1 | 6/2021 | Nir et al. | |
| 2024/0004911 | A1 * | 1/2024 | Rossetto | G06F 16/3347 |
| 2024/0038271 | A1 * | 2/2024 | de Juan | G11B 27/031 |
| 2024/0126799 | A1 * | 4/2024 | Anderson | G06F 40/279 |
| 2024/0419927 | A1 * | 12/2024 | Agrawal | G06F 40/58 |

OTHER PUBLICATIONS

“Topic Modeling Basics”, Retrieved From: https://cloud.google.com/contact-center/insights/docs/topic-modeling-basics, Sep. 15, 2023, 2 Pages.

(Continued)

*Primary Examiner* — Pierre Louis Desir

(57) ABSTRACT

Systems and methods for semantic temporal segmentation based on topic recognition are disclosed. Text classification and segmentation may be used to index media content for subsequent searches. The method may include using a text classification model to semantically analyze sentences in a text file (such as a transcript) to determine topics with which sentences are associated. The output of the text classification model may be provided to a text segmentation model to enable more-accurate identification of text segments (e.g., paragraphs) within the text file. In some examples, the output of a text segmentation model is provided to a text classification model to enable the text classification model to perform more-accurate classification based on text segments rather than (or in addition to) performing classification on single sentences. The classification of the text segments may be used to assign labels to the text segments to enable subsequent searches based on the labels.

20 Claims, 7 Drawing Sheets

(56) References Cited

OTHER PUBLICATIONS

Beltagy, et al., "Longformer: The Long-Document Transformer", In repository of arXiv:2004.05150v2, Dec. 2, 2020, 17 Pages.
He, et al., "DebertaV3: Improving Deberta using Electra-Style Pre-Training with Gradient-Disentangled Embedding Sharing", In repository of arXiv:2111.09543v2, Dec. 8, 2021, 17 Pages.
Nir, et al., "CAST: Character labeling in Animation using Self-supervision by Tracking", In Journal of Computer Graphics Forum, vol. 41, Issue 2, May 24, 2022, pp. 135-145.
Sun, et al., "TDViT: Temporal Dilated Video Transformer for Dense Video Tasks", In Proceedings of 17th European Conference on Computer Vision, Oct. 23, 2022, 17 Pages.

* cited by examiner

SEMANTIC TEXT SEGMENTATION BASED ON TOPIC RECOGNITION

BACKGROUND

Natural language models can be used to classify text content by identifying topics within the text content. The text content can then be tagged with one or more labels (e.g., representing topics) to enable a user to subsequently locate relevant portions of the text by searching for a particular label or topic.

In some cases, it may be desirable to be able to similarly search media content (e.g., audio and/or video content) for portions of interest. It may be difficult, however, to identify and classify portions of media content in a large media archive because the media data is unstructured and thus unsearchable as-is. One approach to making media content searchable is to manually tag segments of the media content with relevant labels (e.g., using metadata-like topic categorization), but manual tagging is expensive and not scalable.

It is with respect to these and other considerations that examples are presented herein. In addition, although relatively specific problems have been discussed, it should be understood that the examples should not be limited to solving the specific problems identified in the background.

SUMMARY

Examples described in this disclosure relate to systems and methods for semantic text segmentation based on topic recognition. Various examples relate to the use of text segmentation and text classification as part of these systems and methods. In one example, a text segmentation model uses the classification results from a text classification model to segment an input text file. In another example, a text classification model uses the segmentation results from the text segmentation model to classify text segments and refine parameters of the text classification model. In some examples, the output of the text segment classification is used to assign labels to text segments for use in subsequent searches.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

DETAILED DESCRIPTION

Figure 1:
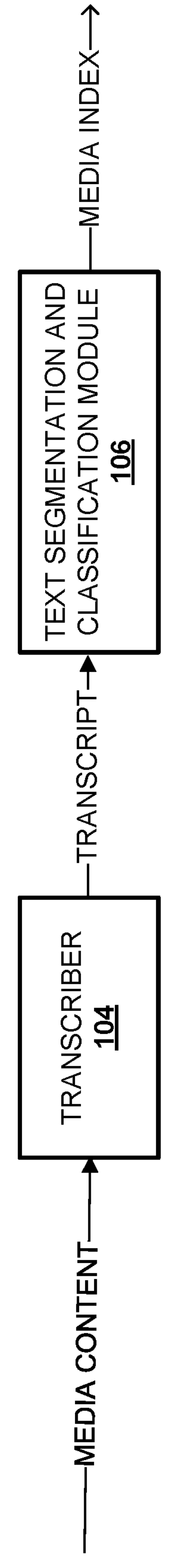
FIG. 1 is a block diagram of a system for providing semantic text segmentation based on topic recognition in accordance with some examples.

Examples described in this disclosure relate to systems and methods for semantic text segmentation based on topic recognition. In some examples, semantic text segmentation based on topic recognition can be used to index media content (e.g., audio and/or video content) for subsequent searches, such as by analyzing a transcript of the media content. The transcript can be generated using a transcription algorithm, such as an automatic speech recognition (ASR) algorithm. Such transcripts can include, for example, sentences and corresponding timestamps (e.g., relative or absolute times or durations over which the corresponding sentences were spoken during the audio or video). Such text can be analyzed using machine learning algorithms, such as large language model (LLM)-based text classification models and text segmentation models, to identify topics associated with a particular portion of the text and determine (and output) one or more labels associated with the portion of the text based on the identified topics. Such labels can subsequently be used to search a transcript and/or the corresponding media content.

In some examples, a text classification model analyzes each sentence of a transcript independently to identify topics associated with each sentence. Such an approach may be ineffective, however, because some sentences are too short or lack sufficient context to enable accurate topic classification. Performing topic classification using large portions of text (such as an entire text file or transcript) potentially leverages a wider context for classifying each sentence but may be prohibitively computationally demanding. In addition, this method may not enable the text classification model to recognize evolving patterns throughout the content since it analyzes an entire text sequence (e.g., transcript) at the same time. Moreover, if sentences in the text are accompanied by time stamps, such as in lines of a transcript, grouping sentences that are temporally distant may not yield meaningful results.

Thus, as described herein, performing semantic text segmentation before or in conjunction with text classification to identify appropriate sentence groupings for classification analysis improves the accuracy of the classification. A text segmentation algorithm may be used to identify segments of related text (e.g., paragraphs) within a text file such that the segments can subsequently be used for classification. For example, a text segmentation model may segment a text file into paragraphs (e.g., groups of related sentences), and the text classification model can then identify, based on a semantic analysis of the whole paragraph, topics that are associated with the paragraph.

Determining which (and how much) text to group into segments (e.g., identifying paragraphs within the text) may itself be challenging, however. As previously mentioned, sentences that are spatially adjacent within a text file but separated by relatively large time gaps may not be meaningfully related despite their spatial proximity. In addition, some text files include rapidly changing topics. For example, each scene in a sitcom transcript may be related to a different subject such that some consecutive sentences in the transcript (e.g., consecutive sentences that span scenes) are entirely unrelated. To determine appropriate segmentation, it is beneficial to provide the output of the text classification model to the text segmentation model to enable context-aware semantic segmentation of the text.

As described herein, in some examples, the outputs of a text classification model are provided to a text segmentation model, and the outputs of the text segmentation model are provided to the text classification model to improve both the text segmentation and the text classification. In some examples, text classification and segmentation are implemented as a combined operation based on both local and global semantic analysis of text. Additional details regarding systems for providing semantic text segmentation based on topic recognition are discussed with reference to FIGS. 1-6. Although the examples depicted in these figures describe the use of the disclosed techniques for analyzing transcripts of media content, these techniques should not be considered as limited to this form of textual content. For example, similar techniques can be applied to textual content that is not generated as a transcript (e.g., articles, books) and/or does not include timestamps.

FIG. 1 is a block diagram of a system 100 for providing semantic text segmentation based on topic recognition in accordance with one example. As depicted, the example system 100 includes a transcriber 104 and a text segmentation and classification module 106. In an example, the transcriber 104 and text segmentation and classification module 106 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art.

Transcriber 104 receives media content (e.g., live or recorded audio and/or video content) and generates a text transcript of the media content. Transcriber 104 may use a variety of algorithmic approaches to generate the transcript based on the media content. For example, transcriber 104 may implement automatic speech recognition (ASR) to generate the transcript based on spoken words. Transcriber 104 may generate the transcript using closed-captioning text provided with the media content, or using a gesture recognition algorithm to transcribe sign language depicted in the media content. In some examples, the transcriber 104 is used to process streamed (e.g., live) media content and/or stored media content. Streamed media content may be received from any microphone, camera, or image capture device capable of capturing audio or video content that can be processed by the transcriber 104. As an example, streamed video content may correspond to video content that is created (e.g., captured) using a video camera compatible with the Real-Time Streaming Protocol (RTSP). Streamed video may also be received from other cameras, such as closed-circuit television (CCTV) cameras and security cameras. Stored media content may be received from any media management system or another type of media storage system.

In the example of FIG. 1, transcriber 104 generates and outputs a transcript that includes sentences detected in the media content and corresponding timestamps. In some examples, each sentence is associated with a timestamp that indicates the relative or absolute time (e.g., in HH:MM:SS format) in the media content at which the sentence was included, such as a time at which the sentence was uttered in the media content or a time at which a closed-caption text sentence appeared in the media content. In some examples, each sentence is associated with a starting timestamp indicating the time (or approximate time) at which the first word or syllable of the sentence appeared in the transcript, and an ending timestamp indicating the time (or approximate time) the sentence was completed (e.g., the time at which the last word or syllable was uttered). As used herein, the term "timestamp" may refer to a single timestamp value, a starting timestamp/ending timestamp pair that specifies a time interval (which may be referred to as a timestep), a starting timestamp and a timestep duration, or any other time-based information that can be used to temporally locate a sentence within a transcript.

In some examples, text segmentation and classification module 106 receives the transcript and semantically analyze the transcript to identify topics associated with portions of the transcript. The output of the text segmentation and classification module 106 can be used to generate a media index for the media content, such as a list of topics or labels and corresponding timestamps with which the topics or labels are associated. Such a media index can be used to enable searches of the media content based on topics or labels.

As will be described herein, the text segmentation and classification module 106 operates to execute a number of computer readable instructions, data structures, or program modules to provide semantic text segmentation based on topic recognition.

In some examples, the text segmentation and classification module 106 is implemented using a text classification model (e.g., a natural language model configured to classify text, which may include a text encoder) and a text segmentation model (e.g., a natural language model configured to parse text into segments) that provide output data to each other to enable refinement of results, as described with reference to FIGS. 2-3. In some examples, the text segmentation and classification module 106 is implemented using an LLM based on a multi-layer neural network that includes a text encoder, fusion-layer transformer, and text segmenter/classifier, as described with reference to FIG. 4.

Figure 2:
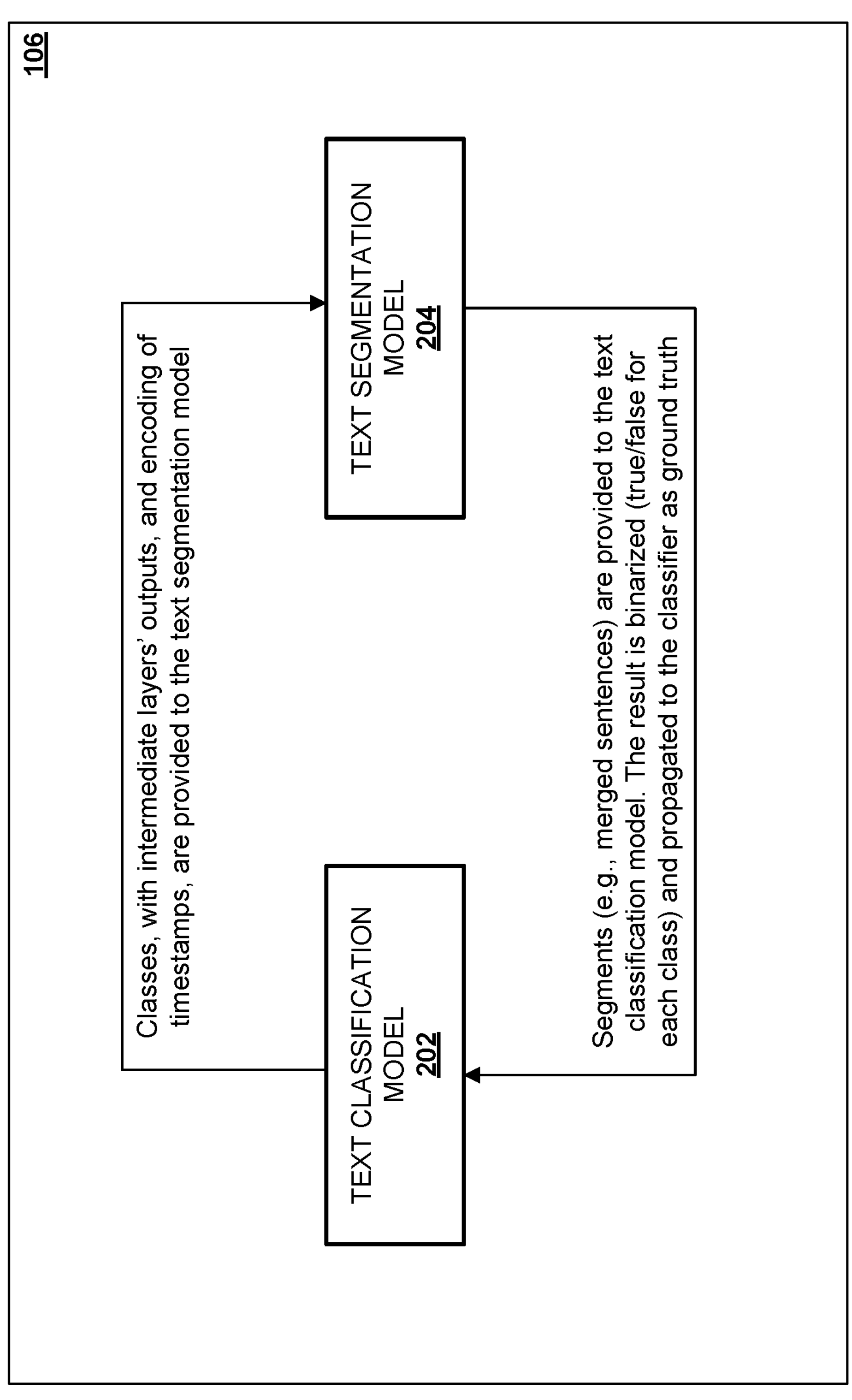
FIG. 2 is an example of a text segmentation and classification module for providing semantic text segmentation based on topic recognition in accordance with some examples.

FIG. 2 depicts an example feedback relationship between a text classification model 202 and a text segmentation model 204. In some examples, the text classification model 202 initially receives a text file, such as a transcript, and semantically analyzes each sentence of the text file to determine classes (e.g., topics) associated with each sentence, such as by determining a probability that the sentence is related to the class. In some examples, the text classification model 202 determines that a sentence is related to a class based on determining that the probability that the sentence is related to the class exceeds an absolute threshold or based on determining that the probability that the sentence is related to the class exceeds a probability that the sentence is related to a different class. For example, the text classification model 202 may determine the most likely class(es) to which the sentence is related by selecting the class(es) with the highest probability values. In some examples, the classes are predetermined and the text classification model 202 determines, for a given a sentence, with which classes of a list of predetermined classes the sentence is associated. For example, the list of predetermined classes may be prepopulated by a user (e.g., a developer or an administrator) and stored in a data store (e.g., in memory or in a local file system) accessible by the text classification model 202. In some examples, the text classification model 202 is an LLM that is trained using the list of predetermined classes. In some examples, the text classification model 202 implements multi-label classification, in which multiple labels or classes can be assigned to a portion of text based on a determination of classes associated with the portion of text. The text classification model 202 may perform this classification using a transformer architecture that includes text encoding, such as Bidirectional Encoder Representations from Transformers (BERT), Robustly Optimized BERT Pre-training Approach (RoBERTa), A Lite BERT (ALBERT), Embeddings from Language Models (ELMo), or Generative Pre-Trained Transformer (GPT), or using other text classification algorithms or models such as Support Vector Machines (SVM), Naive Bayes, a convolutional neural network (CNN), or a recurrent neural network (RNN). In some examples, the text classification model 202 includes an LLM based on a multi-layer neural network that includes an input layer at which data representing a text input is received (such as an embeddings vector), one or more hidden layers that perform one or more non-linear transformations of the data, and an output layer at which the classification results are outputted. In some examples, the text classification model 202 determines a probability corresponding to each class; e.g., a probability that the sentence under consideration is associated with a particular class.

In some examples, the text classification model 202 provides, to the text segmentation model 204, the classes (and/or class probabilities) associated with each sentence, the outputs from one or more hidden layers of the text classification model 202, and an encoded timestep associated with each sentence or text segment.

In some examples, the text segmentation model 204 uses the information received from the text classification model 202 to help parse the text into text segments (e.g., segment the text) by identifying related groups of sentences (e.g., paragraphs). For example, the text segmentation model 204 may determine whether two or more spatially adjacent sentences should be merged into the same text segment (e.g., paragraph) based on their temporal relationship (e.g., how close together they are in time), their semantic relationship (e.g., whether they are likely to be related to the same topic, as indicated by the class probabilities), and/or based on other factors (e.g., the identity of a speaker, interests or preferences of a speaker, historical media content received from a speaker). In some examples, the text segmentation model 204 generates a text segment by merging semantically related sentences into the text segment. In some examples, the text segmentation model 204 is implemented using text segmentation algorithms such as BERT, natural language toolkit (NLK) models, or byte-pair encoding (BPE).

In some examples, the text segmentation model 204 provides, to the text classification model 202, the text segments generated by the text segmentation model 204. For example, the text segmentation model 204 may merge two or more sentences into a single text segment and provide the text segment to the text classification model 202. In some examples, the text classification model 202 classifies each text segment received from the text segmentation model 204 in a manner similar to that previously described with respect to classifying sentences and outputs an indication of the classes with which each text segment is associated. In some examples, the text classification model 202 backpropagates the output of the text segment classification as a "ground truth" (e.g., a known good value) to update (e.g., train) the text classification model 202, such as by adjusting one or more parameters of the text classification model 202, to improve the accuracy of the text classification model 202 during subsequent classification operations.

Additional details regarding the flow of information between the text classification model 202 and the text segmentation model 204 are described with reference to FIG. 3.

Figure 3:
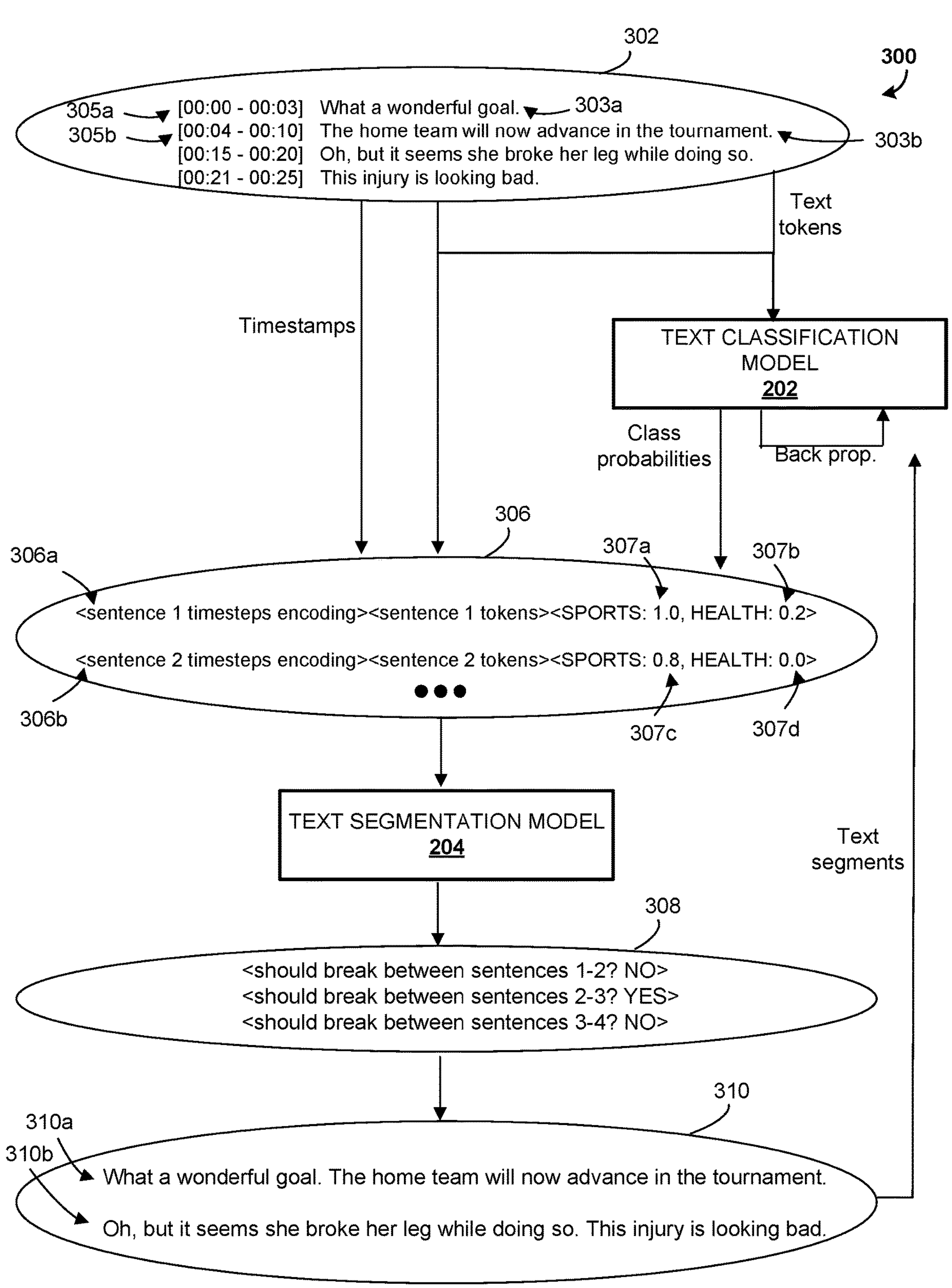
FIG. 3 is a block diagram of a data flow for providing semantic text segmentation based on topic recognition in accordance with some examples.

FIG. 3 depicts a data flow 300 for performing semantic text segmentation based on topic recognition, in accordance with some examples. Initially, a plurality of time-stamped sentences 302 (e.g., including sentence 1 303*a* and sentence 2 303*b*) is received (e.g., from a transcriber 102). In some examples, each sentence is associated with a corresponding timestamp. For example, sentence 1 303*a* of the plurality of timestamped sentences 302 is associated with timestamp 305*a* ([00:00-00:03]), which in the example of FIG. 3 includes a beginning timestamp 00:00 and an ending timestamp 00:03 that collectively indicate a time duration over which sentence 1 was uttered. Similarly, sentence 2 303*b* is associated with timestamp 305*b*.

In some examples, each sentence is analyzed to determine (e.g., identify, extract, generate) a set of tokens (i.e., one or more tokens) for the sentence; e.g., each sentence is tokenized using a tokenization algorithm. The set of tokens may include syllables, words, phrases, and/or punctuation marks that appear within the sentence. In some examples, the tokens are represented as numeric values. In some examples, the set of tokens for a sentence includes all of the words and/or all of the punctuation marks that are present in the sentence. For example, the set of tokens for sentence 1 303 may include five tokens: "What", "a", "wonderful", "goal", "." In some examples, the set of tokens may omit one or more words and/or punctuation marks in the sentence, such as by omitting stop words.

In some examples, the set of tokens for each sentence (and optionally, the corresponding timestamps) are provided to the text classification model 202 for analysis. In some examples, the text classification model 202 uses the set of tokens for each sentence to determine the probability that the sentence is related to (e.g., associated with) one or more classes (e.g., topics) of a list of predefined classes, a process that may be referred to as text classification or topic recognition. In some examples, the text classification model 202 includes a text encoder that generates a corresponding embeddings vector for each sentence by semantically analyzing the text tokens for each sentence. In some examples, the embeddings vector is a vector of numeric values that represent the literal and/or semantic content of the sentence, such as by indicating which words are in the sentence, the word frequency, semantic information associated with the sentence, or other types of information. In some examples the text classification model 202 uses the set of tokens and/or the generated embeddings vector for each sentence to determine the probability that the sentence is related to a particular class.

In the example of FIG. 3, the text classification model 202 determines, for each sentence (e.g., based on the corresponding set of tokens for the sentence), a probability that the sentence is related to the class of "SPORTS" and a probability that the sentence is related to the class of "HEALTH."

In some examples, the text classification model 202 outputs, for each sentence, the probability that the sentence is related to each of the classes under consideration (e.g., the text classification model 202 outputs one class probability value for each of the classes). In some examples, the probability is expressed as a number between 0 and 1, where a value of 0 indicates that there is zero probability that the sentence is related to the class, and a value of 1 indicates certainty that the sentence is related to the class. In some examples, the probability is represented in another manner.

In the example of FIG. 3, sentence 1 303*a* ("What a wonderful goal.") is determined, by the text classification model 202, to have a first probability 307*a* of 1.0 that it is related to the "SPORTS" class and a second probability 307*b* of 0.2 that it is related to "HEALTH" class. That is, the text classification model 202 determines that sentence 1 303*a* is almost certainly related to SPORTS and not very likely to be related to HEALTH. Similarly, sentence 2 303*b* ("The home team will now advance to the tournament.") is determined, by the text classification model 202, to have a first probability 307*c* of 0.8 that it is related to the "SPORTS" class and a second probability 307*d* of 0.0 that it is related to "HEALTH" class. That is, sentence 2 303*b* is determined to be very likely to be related to SPORTS and very unlikely to be related to HEALTH.

In some examples, the text tokens, timestamps (which may be encoded into encoded timesteps), and class probabilities for each sentence form a classification record for each sentence, such that the plurality of timestamped sentences 302 is associated with a corresponding plurality of classification records 306. For example, classification record 306*a* corresponds to sentence 1 303*a* of the plurality of sentences 302, and classification record 306*b* corresponds to sentence 2 303*b* of the plurality of sentences 302. Although for brevity, FIG. 3 only depicts classification records for sentence 1 and sentence 2, similar classification records may be generated for sentence 3 ("Oh, but it seems she broke her leg while doing so.") and sentence 4 ("This injury is looking bad."). In some examples, each classification record includes an explicit indication of each class and the corresponding probability for the class. In some examples, each classification record includes the class probabilities in a predefined order such that the corresponding class can be inferred; e.g., the classes are indicated implicitly and are not included in (e.g., are excluded from) the classification records.

In some examples, the classification records 306 are provided to the text segmentation model 204 to enable the text segmentation model 204 to perform semantic temporal segmentation (e.g., to identify text segments) based on class probabilities, timestamps, and/or tokens. In some examples, the text segmentation model 204 analyzes spatially adjacent (e.g., consecutive) pairs of classification records 306 (e.g., classification records corresponding to spatially adjacent sentences in the plurality of timestamped sentences 302) to determine (e.g., identify) whether the corresponding sentences should be grouped into a text segment, such as a paragraph. In some examples, the text segmentation model 204 determines whether two consecutive sentences should be grouped into a segment based on a comparison of the timestamps and/or encoded timesteps associated with the two sentences, the set of tokens for each of the two sentences, and/or the class probabilities associated with each of the two sentences. For example, the text segmentation model 204 may determine that two sentences should be grouped into a single segment based on having temporally adjacent timestamps with a relatively small elapsed duration between them, based on having similar probabilities that they are related to a particular class (or classes), based on having similar tokens, and/or based on other factors. In some examples, a text segment can contain one or more sentences.

In some examples, the text segmentation model 204 outputs an indication of which sentences should be grouped into a text segment. In the example of FIG. 3, the text segmentation model 204 outputs segmentation information 308 that indicates, for each pair of consecutive sentences in the plurality of timestamped sentences 302, whether the two sentences should be grouped together into the same segment or broken into different segments.

In some examples, based on the identification of sentences that should be grouped into a text segment (e.g., based on the segmentation information 308), the text segmentation model 204 (or another processing module) merges (e.g., concatenates) groups of sentences into one or more text segments (such as text segment 310*a*, which includes sentence 1 and sentence 2, or text segment 310*b*, which includes sentence 3 and sentence 4) and outputs the text segments to the text classification model 202. In some examples, each text segment 310 includes or is represented by a set of tokens, which may be, for example, a set that includes the set of tokens associated with each sentence in the segment. In some examples, the text classification model 202 analyzes each text segment received from the text segmentation model 204 (e.g., by analyzing the set of tokens for each sentence in the text segment) to determine a probability that the text segment is related to a particular class of the list of predefined classes, in a manner similar to that described above with respect to classifying individual sentences. In this case, however, the text classification model 202 can analyze the content (e.g., tokens) of multiple sentences (e.g., sentences contained in a text segment) that have been determined, by the text segmentation model 204, to be related to each other rather than analyzing the content of each sentence independently from other sentences. In some examples, the text classification model 202 outputs, for each text segment, the probability that the segment is related to each of the classes under consideration (e.g., the text classification model 202 outputs one class probability value for each of the classes).

In some examples, the output of this second classification operation (e.g., the text segment classification) is binary—that is, instead of determining a probability that a segment is related to a class, where the probability can range from 0 to 1, the text classification model 202 may determine, in a binary manner, whether a text segment is or is not related to a class (e.g., the probability is either 0 or 1 but cannot be an intermediate value).

In some examples, the output of the text segment classification (e.g., the probability that the text segment is related to a class) is used to determine a label(s) that is associated with the text segments (and/or associated with timestamps corresponding to the text segments) to enable a user to search the transcript or corresponding media content for a topic(s) by entering or selecting one or more labels (e.g., by providing a user input) which are then matched to labels associated with text segments and/or corresponding timestamps. A label assigned to a text segment may be stored with a first timestamp associated with the first sentence in the text segment, a second timestamp associated with the last sentence in the text segment, or both (e.g., indicating a timestep between the first sentence and the last sentence) to enable a user to search for a label and retrieve the relevant portion of the media content. For example, a user interface associated with a media application or service may include a plurality of affordances indicating labels that can be selected for a search. In response to detecting a user selection of an affordance associated with a label, the media application or service may present corresponding portions of the media content that have been tagged with the selected label. For example, the media application or service may use the selected label to look up (e.g., retrieve) one or more corresponding timestamps in the media content. In some examples, the media application may identify one or more portions of the media content corresponding to the one or more timestamps, and may present (e.g., display or play) the one or more portions of the media content.

In some examples, the labels may be the same as the classes (e.g., the labels may include "SPORTS" and "HEALTH"). In some examples, the labels may be different from the classes (e.g., a text segment that has been determined to be associated with the topic of "SPORTS" may be tagged with the labels "FITNESS" and "GAME"). In some examples, the labels are outputted by the text classification model 202. In some examples, the labels are outputted by a different program module based on the outputs of the text classification model 202. In some examples, outputting the labels includes storing the labels.

In some examples, the output of the text segment classification (e.g., the class probabilities or binary values) are backpropagated to the text classification model 202 as a ground truth, and the text classification model 202 uses this information to automatically update one or more parameters of the text classification model 202. In this manner, the text classification model 202 can automatically refine (e.g., train) its own model based on information received from the text segmentation model 204, thereby enabling more accurate classification results during subsequent analyses.

The example depicted in FIG. 3 depicts the use of explicit feedback from the text segmentation model 204 to the text classification model 202 to improve both the classification results and the text classification model 202 itself. In some cases, it may be desirable to implement semantic text segmentation based on topic recognition in a single flow, without explicit feedback, such as described with reference to FIG. 4.

Figure 4:
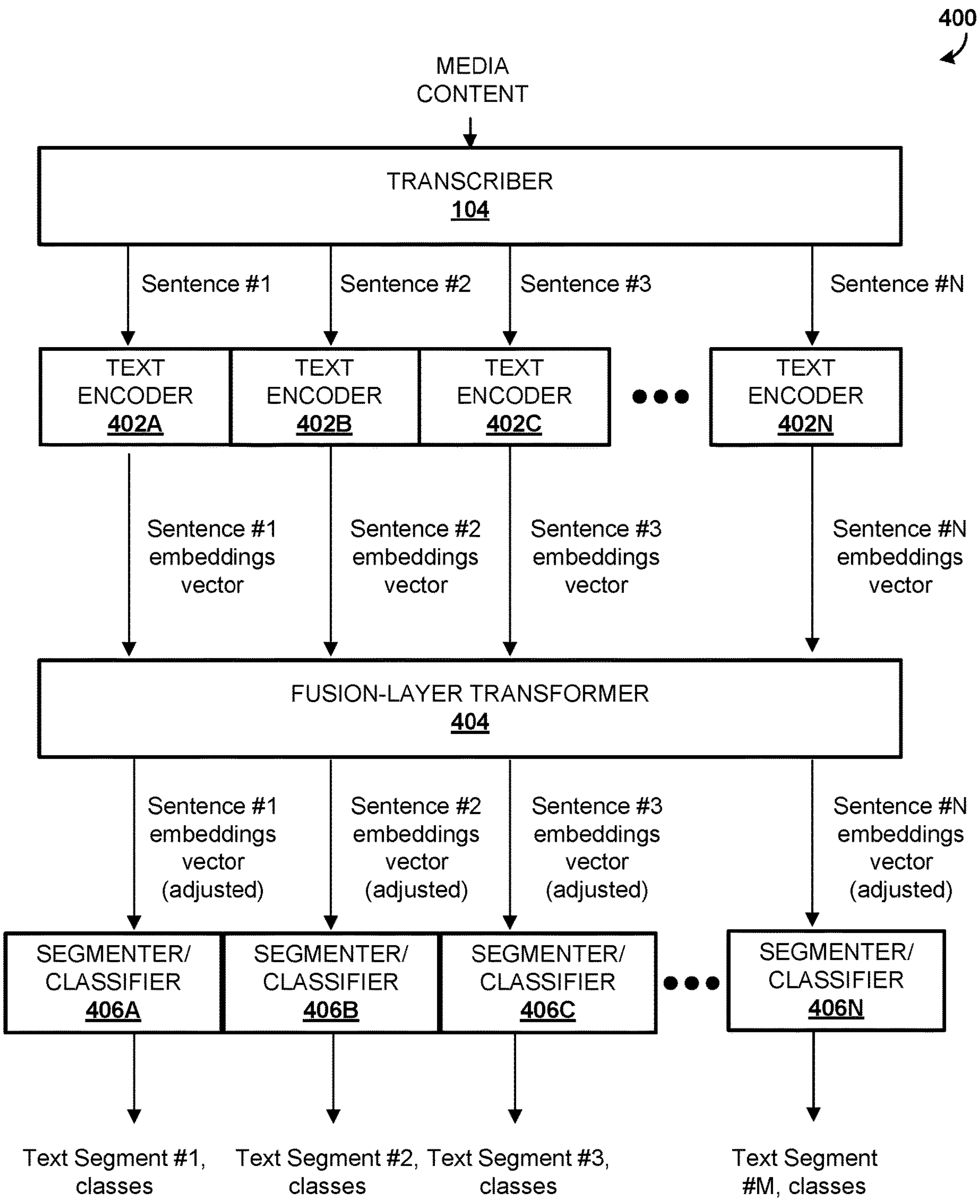
FIG. 4 is a block diagram of a data flow for providing semantic text segmentation based on topic recognition in accordance with some examples.

FIG. 4 depicts an example data flow 400 for providing semantic text segmentation based on topic recognition. The example of FIG. 4 includes a plurality of text encoders 402A-402N, a fusion-layer transformer 404, and one or more text segmenter/classifiers 406A-N. In some examples, the text encoders 402, fusion-layer transformer 404, and segmenter/classifiers 406 collectively implement multi-task dense text classification and segmentation, as described below.

In FIG. 4, a transcriber 104 receives media content and produces a transcript that includes a plurality of sentences (optionally, with corresponding timestamps such as described with reference to FIGS. 1 and 3). In some examples, each sentence is provided to a corresponding text encoder 402A-N and encoded into a corresponding embeddings vector in parallel. Additionally or alternatively, in some examples, sentences are encoded sequentially by a single text encoder.

In some examples, the text encoders 402A-N each comprise a multi-layer neural network that tokenizes a sentence into a set of tokens and generates an embeddings vector for each sentence based on a semantic analysis of the tokens and the context associated with the tokens, such as by considering other tokens within the same sentence. In some examples, the embedding vectors are dense vectors; that is, they have multiple non-zero elements. In some examples, the text encoders 402A-N implement a language model, such as BERT or another language model.

In some examples, the text encoders 402A-N output, to a fusion-layer transformer 404, an embeddings vector for each sentence. In some embodiments, the fusion-layer transformer 404 fuses (e.g., combines) the semantic contents of the separate embeddings vectors by implementing a global attention mechanism across the sentences generated by the transcriber 104 (e.g., using multiple or all of the embeddings vectors received from the text encoders 402A-N). In some examples, the fusion-layer transformer 404 includes a Longformer transformer or another transformer that implements both a local (e.g., sliding window) attention mechanism and a global attention mechanism to determine semantic relationships across some or all of the transcript produced by the transcriber 104 and adjust the embeddings vectors (e.g., change the value of one or more elements of each embeddings vector using vector or matrix multiplication) to more accurately represent the semantic content of the sentences based on the larger context.

In some examples, the fusion-layer transformer 404 outputs the adjusted embeddings vectors to the one or more segmenter/classifiers 406A-N. In some examples, the segmenter/classifiers 406A-N identify sentences that should be grouped into text segments (e.g., in a manner similar to that described with reference to the text segmentation model 204 of FIG. 3) and classify each text segment based on the adjusted embeddings vector (e.g., by identifying classes with which each text segment is associated in a manner similar to that described with respect to the text segment classification by the text classification model 202 of FIG. 3). In some examples, the classifier/segmenters 406A-N output text segments and an indication of which classes are associated with each segment, such as by outputting one or more class probabilities. In some examples, the classifier/segmenters 406A-N output M text segments, where 1≤M≤N. In some examples, the outputs of the classifier/segmenters 406A-N are used to generate a media index and/or label the transcript or media content based on the identified classes as previously described.

Figure 5:
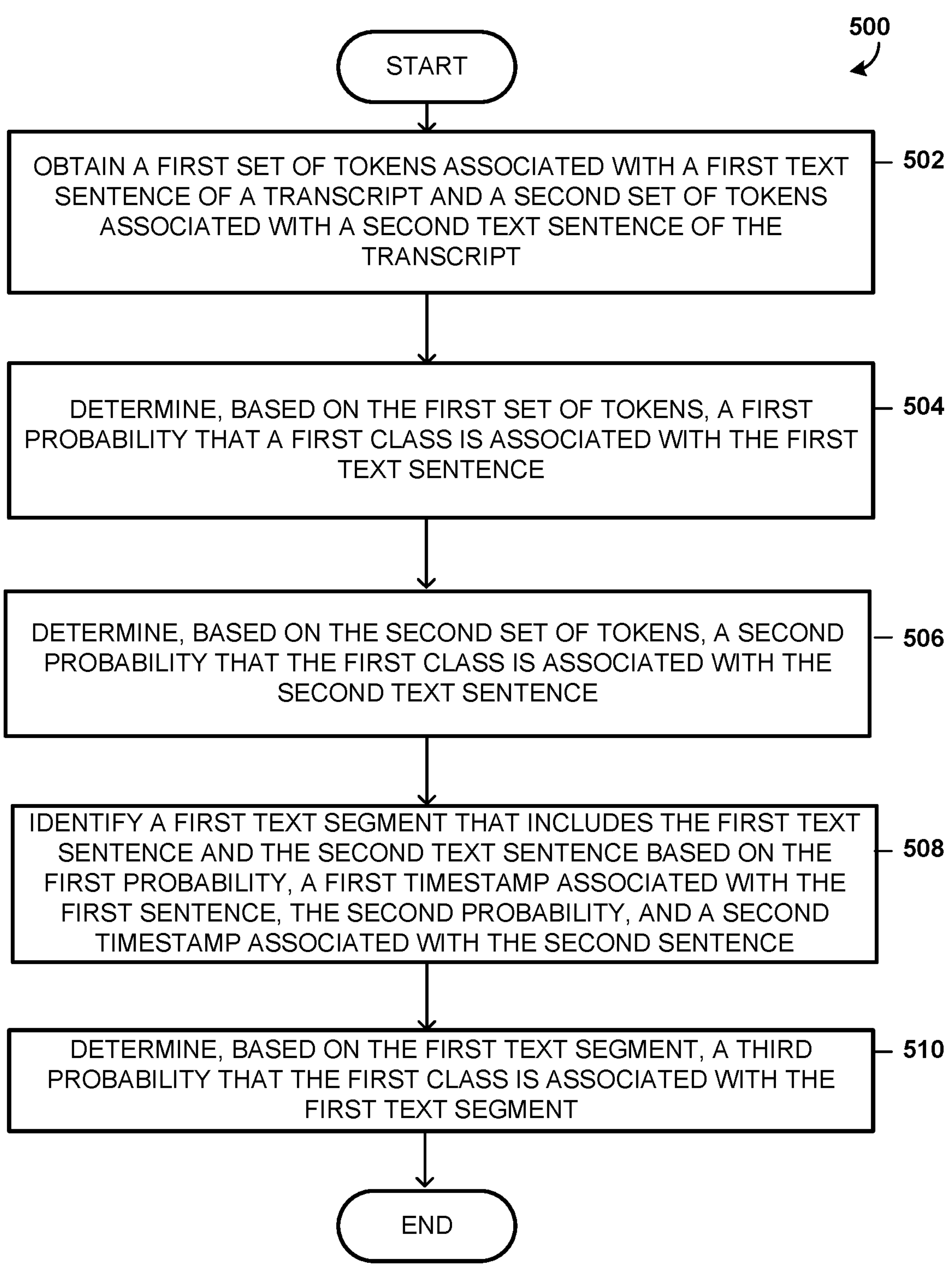
FIG. 5 is a flowchart depicting an example method for performing semantic text segmentation based on topic recognition in accordance with some examples.

FIG. 5 depicts flowchart of a method 500 for semantic temporal segmentation based on topic recognition according to an example is provided. The operations of method 500 may be performed by one or more computing devices, such as the computing device 700 depicted in FIG. 7. In some examples, certain operations depicted in method 500 may be combined, rearranged, or omitted.

At operation 502, a computing device obtains (e.g., generates or receives) a first set of tokens associated with a first sentence of a transcript and a second set of tokens associated with a second sentence of the transcript. In some examples, the first set of tokens and the second set of tokens are generated by a tokenizer, such as tokenizer 301. For example, in FIG. 3, tokenizer 301 generates a first set of tokens associated with sentence 1 ("Oh what a wonderful goal.") and a second set of tokens associated with sentence 2 ("The home team will now advance in the tournament.").

At operation 504, the computing device determines, based on the first set of tokens, a first probability that a first class is associated with the first sentence. For example, in FIG. 3, the text classification model 202 determines a first probability 307*a* (1.0) that a first class (SPORTS) is associated with sentence 1 (e.g., the first probability indicates a probability that sentence 1 is related to the class of SPORTS).

At operation 506, the computing device determines, based on the second set of tokens, a second probability that the first classis associated with the second sentence. For example, in FIG. 3, the text classification model 202 determines a second probability 307*c* (0.8) that the first class (SPORTS) is associated with sentence 2 (e.g., the second probability indicates a probability that sentence 2 is related to the class of SPORTS).

At operation 508, the computing device identifies, based on the first set of tokens, the first probability, a first timestamp associated with the first sentence, the second set of tokens, the second probability, and a second timestamp associated with the second sentence, a first text segment comprising the first sentence and the second sentence. For example, in FIG. 3, the text segmentation model 204 identifies a first text segment 310*a* that includes sentence 1 and sentence 2.

At operation 510, the computing device determines a third probability that the first classis associated with the first text segment. For example, the text segmentation model 204 of FIG. 3 may determine a probability that the class of "SPORTS" is associated with a text segment 310*a* that includes sentence 1 and sentence 2 (e.g., the third probability indicates a probability that text segment 310*a* is related to the class of SPORTS). In some examples, the computing device determines the third probability based on the first set of tokens and the second set of tokens. In some examples, the third probability is different from the first probability, the second probability, or both.

Accordingly, described herein is a computer-implemented method, comprising: obtaining a first set of tokens associated with a first sentence of a transcript and a second set of tokens associated with a second sentence of the transcript; determining, based on the first set of tokens, a first probability that a first class is associated with the first sentence; determining, based on the second set of tokens, a second probability that the first class is associated with the second sentence; identifying a first text segment that includes the first sentence and the second sentence based on the first probability, a first timestamp associated with the first sentence, the second probability, and a second timestamp associated with the second sentence; and determining, based on the first text segment, a third probability that the first class is associated with the first text segment.

In some examples, the computing device updates a parameter of a text classification model (e.g., text classification model 202) based on the third probability. For example, the text classification model 202 back-propagates the output of the text segment classification as described with reference to FIG. 3 and uses the output to update the text classification model 202 itself (e.g., to train the model).

Figure 6:
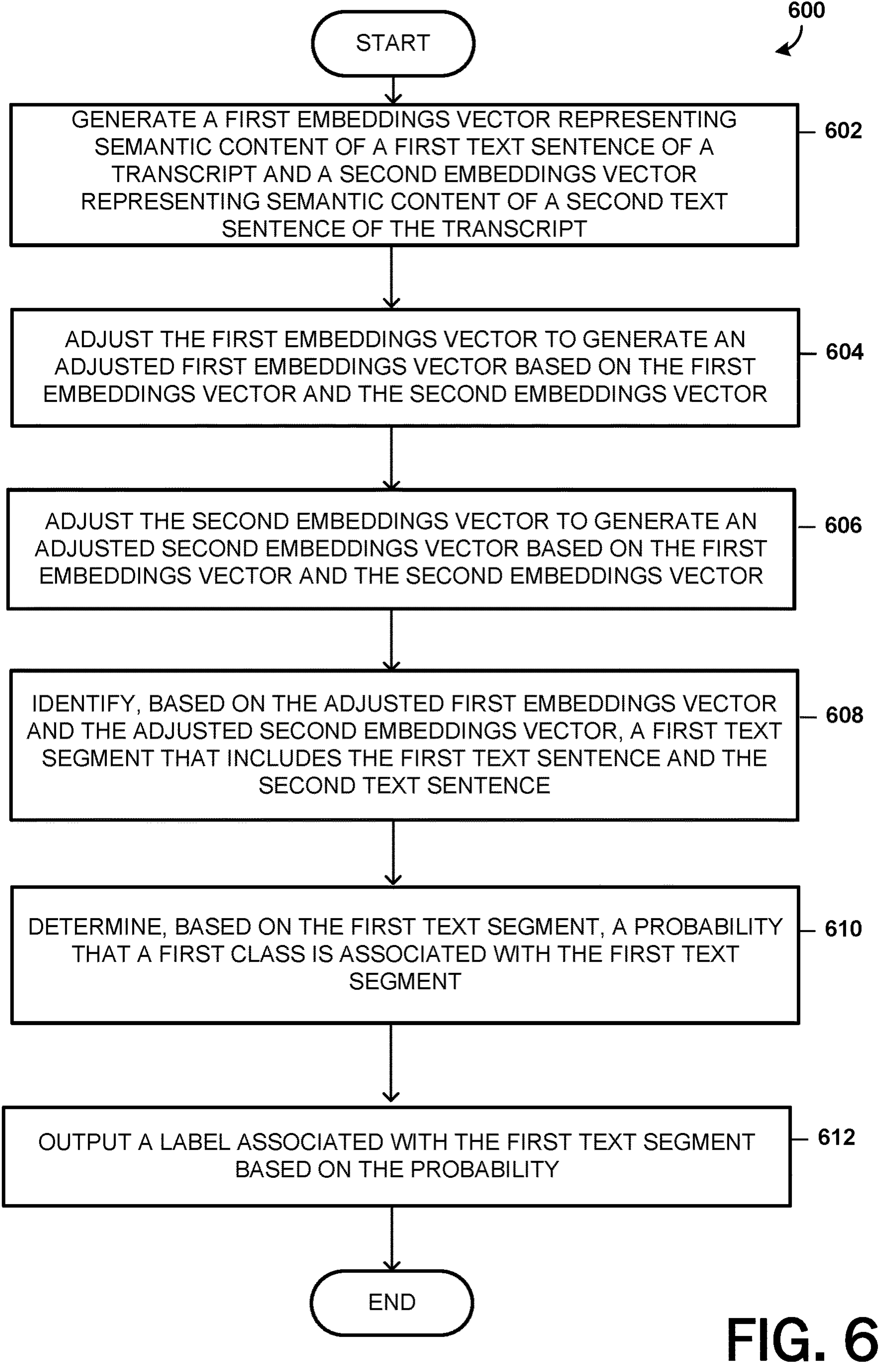
FIG. 6 is a flowchart depicting an example method for performing semantic text segmentation based on topic recognition in accordance with some examples.

FIG. 6 depicts a flowchart of a method 600 for semantic temporal segmentation based on topic recognition according to an example. The operations of method 600 may be performed by one or more computing devices, such as the computing device 700 depicted in FIG. 7. In some examples, certain operations depicted in method 600 may be combined, rearranged, or omitted.

At operation 602, the computing device generates a first embeddings vector representing semantic content of a first sentence of a transcript and a second embeddings vector representing semantic content of a second sentence of the transcript. For example, in FIG. 4, an embeddings vector for sentence 1 is generated by text encoder 402A, and an embeddings vector for sentence 2 is generated by text encoder 402B. In some examples, the first embeddings vector represents semantic content of the first sentence, and the second embeddings vector represents semantic content of the second sentence.

At operation 604, the computing device adjusts the first embeddings vector to generate an adjusted first embeddings vector based on the first embeddings vector and the second embeddings vector. For example, in FIG. 4, the fusion-layer transformer 404 analyzes the first embeddings vector and the second embeddings vector to refine the representation of the semantic content of the first sentence (e.g., the first embeddings vector) based on a comparison of the first embeddings vector with the second embeddings vector.

At operation 606, the computing device adjusts the second embeddings vector to generate an adjusted second embeddings vector based on the first embeddings vector and the second embeddings vector. For example, in FIG. 4, the fusion-layer transformer 404 analyzes the first embeddings vector and the second embeddings vector to refine the representation of the semantic content of the second sentence (the second embeddings vector) based on the comparison of the first embeddings vector with the second embeddings vector.

At operation 608, the computing device identifies, based on the adjusted first embeddings vector and the adjusted second embeddings vector, a first text segment that includes the first sentence and the second sentence. For example, in FIG. 4, one or more segmenter/classifiers 406 identify text segments #1-M, such as using techniques described with respect to the text segmentation model 204 of FIG. 3.

At operation 610, the computing device determines, based on the first text segment, a probability corresponding to a first class, where the probability is associated with the first text segment. For example, in FIG. 4, one or more segmenter/classifiers 406 determine a probability that the text segment is related to a particular class.

At operation 612, the computing device outputs a label associated with the first text segment based on the probability determined at operation 610. For example, if the probability determined at operation 610 indicates that it is likely that the text segment is related to the class of SPORTS, the computing device may output a label of "SPORTS" and/or one or more sports-related labels, such as "GAME" or "FITNESS." For instance, to output a sports-related label, the computing device may store or have access to an ontology that correlates various classes to subclasses having attributes associated with the subclasses. In one ontology, the class of SPORTS is correlated with a subclass of BASEBALL that is associated with attributes, such as "PITCHER," "FIRST BASE," and "HOME RUN." The semantic content of the first text segment is compared to the attributes of the various subclasses of SPORTS to determine whether the semantic content of the first text segment matches or is similar to attributes of a particular subclass. When the semantic content of the first text segment is determined to match or exceed a similarity threshold for attributes of a subclass, the computing device outputs the corresponding label for the subclass. In some examples, the one or more labels may be used to index the transcript and/or to index the media content on which the transcript is based to enable subsequent searches using the labels.

Thus, described herein is a computer-implemented method, comprising: generating a first embeddings vector representing semantic content of a first sentence of a transcript and a second embeddings vector representing semantic content of a second sentence of the transcript; adjusting the first embeddings vector to generate an adjusted first embeddings vector based on the first embeddings vector and the second embeddings vector; adjusting the second embeddings vector to generate an adjusted second embeddings vector based on the first embeddings vector and the second embeddings vector; identifying, based on the adjusted first embeddings vector and the adjusted second embeddings vector, a first text segment that includes the first sentence and the second sentence; determining, based on the first text segment, a probability that a first class is associated with the first text segment; and outputting a label associated with the first text segment based on the probability.

Figure 7:
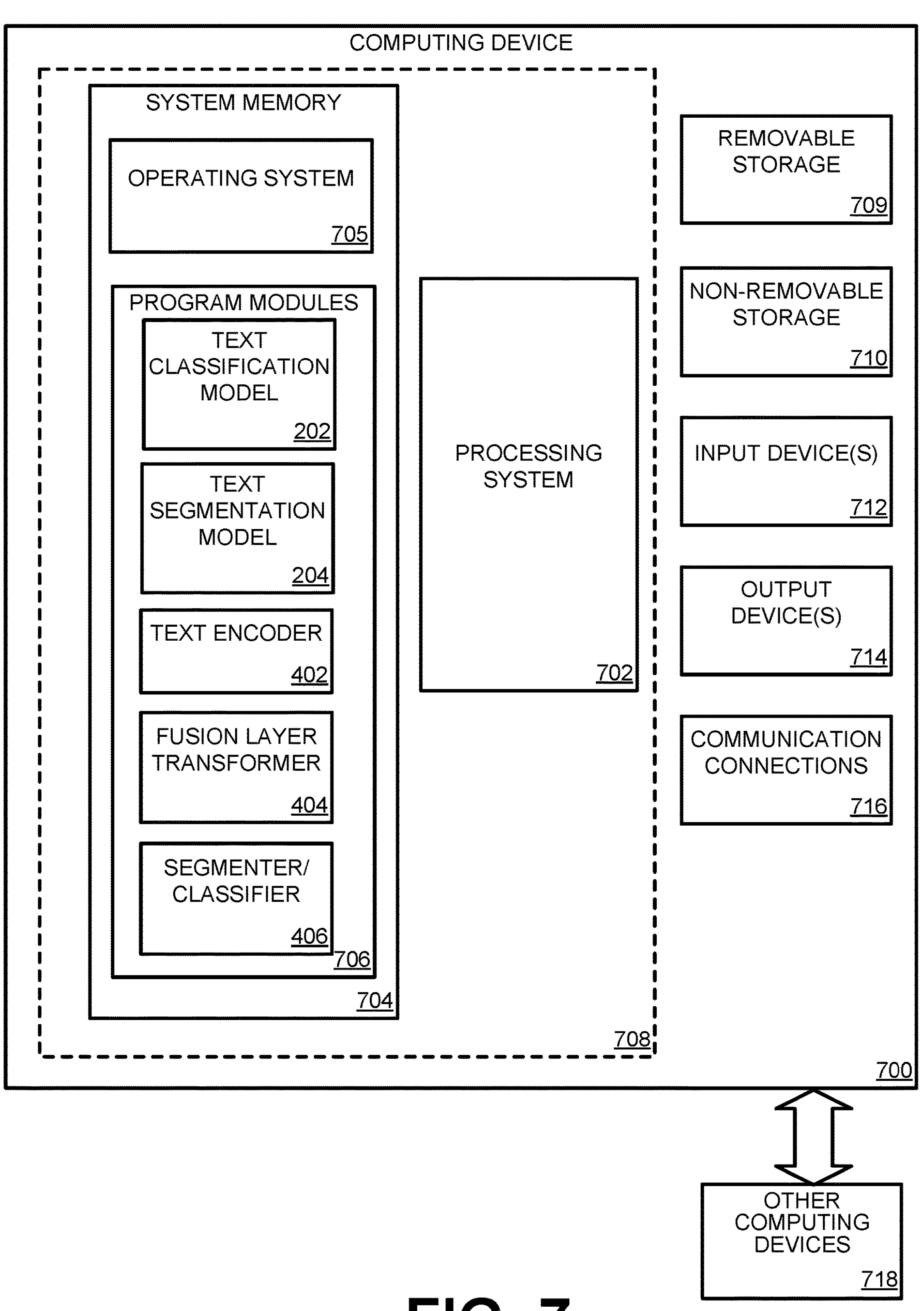
FIG. 7 is a block diagram illustrating example physical components of a computing device with which aspects of the disclosure may be practiced.

FIG. 7 and the associated description provides a discussion of a variety of operating environments in which examples of the disclosure may be practiced. However, the devices and systems illustrated and discussed with respect to FIG. 7 are for purposes of example and illustration; a vast number of computing device configurations may be utilized for practicing aspects of the disclosure described herein.

FIG. 7 is a block diagram illustrating physical components (e.g., hardware) of an example of a computing device 700 with which examples of the present disclosure may be practiced. The computing device components described below may be suitable for one or more of the components of the system 100 described above. In a basic configuration, the computing device 700 includes at least one processing system 702 and a system memory 704. Depending on the configuration and type of computing device 700, the system memory 704 may comprise volatile storage (e.g., random access memory), non-volatile storage (e.g., read-only memory), flash memory, or any combination of such memories. In the example of FIG. 7, the system memory 704 includes an operating system 705 and one or more program modules 706 suitable for performing semantic text segmentation based on topic recognition, such as the text classification model 202, text segmentation model 204, text encoder 402, the fusion-layer transformer 404, and segmenter/classifier 406.

In some examples, text classification model 202, text segmentation model 204, text encoder 402, fusion-layer transformer 404, and/or segmenter/classifier 406 include or are implemented as a large language model (LLM). Example models may include the GPT models from OpenAI, BARD from Google, and/or Large Language Model Meta AI (LLaMA) from Meta, among other types of artificial intelligence (AI) models.

In some examples, the LLM understands and generates sequences of tokens, which may be in the form of natural language (e.g., human-like text). In various examples, the LLM can understand complex intent, cause and effect, perform language translation, semantic search classification, complex classification, text sentiment, summarization, summarization for an audience, and/or other natural language capabilities.

In some examples, the LLM is in the form of a deep neural network that utilizes a transformer architecture to process the text it receives as an input. The neural network may include an input layer, multiple hidden layers, and an output layer. The hidden layers typically include attention mechanisms that allow the LLM to focus on specific parts of the input text, and to generate context-aware outputs. The LLM is generally trained using supervised learning based on large amounts of annotated text data and learns to predict the next word or the label of a given text sequence.

The size of an LLM may be measured by the number of parameters it has. For instance, an LLM may have billions of parameters. These parameters may be weights in the neural network that define its behavior, and a large number of parameters allows the model to capture complex patterns in the training data. The training process typically involves updating these weights using gradient descent algorithms, and is computationally intensive, requiring large amounts of computational resources and a considerable amount of time. In some examples, the LLM is pre-trained, meaning that the LLM has already been trained on the large amount of data. This pre-training allows the model to have a strong understanding of the structure and meaning of text, which makes it more effective for the specific tasks discussed herein. As discussed herein, parameters of the LLM (e.g., as used in the text classification model) may also be adjusted based on the outputs of earlier text segmentation and classification steps (e.g., by back-propagation of results to the model).

The LLM may operate as a transformer-type neural network. Such an architecture may employ an encoder-decoder structure and attention mechanisms (e.g., self-attention mechanisms) to process the input data (e.g., the sentences of a transcript). Initial processing of the text may include tokenizing the text into tokens that may then be mapped to a unique integer or mathematical representation. The integers or mathematical representations combined into vectors that may have a fixed size. These vectors may also be known as embeddings vectors.

The initial layer of the transformer model receives the token embeddings. Each of the subsequent layers in the model may use a self-attention mechanism that allows the model to weigh the importance of each token in relation to every other token in the input. In other words, the self-attention mechanism may compute a score for each token pair, which signifies how much attention should be given to other tokens when encoding a particular token. These scores are then used to create a weighted combination of the input embeddings.

In some examples, each layer of the transformer model comprises two primary sub-layers: the self-attention sub-layer and a feed-forward neural network sub-layer. The self-attention mechanism mentioned above is applied first, followed by the feed-forward neural network. The feed-forward neural network may be the same for each position and apply a simple neural network to each of the attention output vectors. The output of one layer becomes the input to the next. This means that each layer incrementally builds upon the understanding and processing of the data made by the previous layers. The output of the final layer may be processed and passed through a linear layer and a SoftMax activation function. This outputs a probability distribution over all possible tokens in the model's vocabulary. In some examples, the token(s) with the highest probability is selected as the output token(s) for the corresponding input token(s).

The operating system 705 may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, or optical disks. Such additional storage is illustrated in FIG. 7 by a removable storage device 709 and a non-removable storage device 710.

As stated above, a number of program modules and data files may be stored in the system memory 704. While executing on the processing system 702, the program modules 706 may perform processes including one or more of the stages of the method 500 illustrated in FIG. 5 and the method 600 illustrated in FIG. 6. In some examples, such processes and methods may be distributed across multiple processing systems 702, such that each processing system 702 performs a portion of the processes and methods.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such an SOC device may include one or more processing systems, graphics units, communications units, system virtualization units and various application functionality all of which are integrated (or "burned") onto the chip substrate as a single integrated circuit. When operating via an SOC, the functionality, described herein, with respect to providing spatial-textual clustering-based predictive recognition of text in a video may be operated via application-specific logic integrated with other components of the computing device 700 on the single integrated circuit (chip). Examples of the present disclosure may also be practiced using other technologies capable of performing logical operations such as, for example, AND, OR, and NOT, including mechanical, optical, fluidic, and quantum technologies.

In the example of FIG. 7, the computing device 700 also has one or more input device(s) 712 (such as a keyboard, a mouse, a pen, a sound input device, a touch input device, a camera, etc.) and output device(s) 714 (such as a display, speakers, a printer, etc.). The aforementioned devices are examples and others may be used. In some examples, the computing device 700 omits the input device(s) 712 and/or output devices 714. In the example of FIG. 7, the computing device 700 includes one or more communication connections 716 to enable communications with other computing devices 718. Examples of communication connections 716 include a radio frequency (RF) transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 704, the removable storage device 709, and the non-removable storage device 710 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer readable media may be part of the computing device 700. In some examples, computer readable media includes non-transitory computer readable media and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

Examples include a computer-implemented method, comprising: obtaining a first set of tokens associated with a first sentence of a transcript and a second set of tokens associated with a second sentence of the transcript; determining, based on the first set of tokens, a first probability that a first class is associated with the first sentence; determining, based on the second set of tokens, a second probability that the first class is associated with the second sentence; identifying a first text segment that includes the first sentence and the second sentence based on the first probability, a first timestamp associated with the first sentence, the second probability, and a second timestamp associated with the second sentence; and determining, based on the first text segment, a third probability that the first class is associated with the first text segment.

Examples include a computer-implemented method, comprising: generating a first embeddings vector representing semantic content of a first sentence of a transcript and a second embeddings vector representing semantic content of a second sentence of the transcript; adjusting the first embeddings vector to generate an adjusted first embeddings vector based on the first embeddings vector and the second embeddings vector; adjusting the second embeddings vector to generate an adjusted second embeddings vector based on the first embeddings vector and the second embeddings vector; identifying, based on the adjusted first embeddings vector and the adjusted second embeddings vector, a first text segment that includes the first sentence and the second sentence; determining, based on the first text segment, a probability that a first class is associated with the first text segment; and outputting a label associated with the first text segment based on the probability.

Examples include a system comprising: a processor; and memory storing instructions that, when executed by the processor, cause the system to: obtain a first set of tokens associated with a first sentence of a transcript and a second set of tokens associated with a second sentence of the transcript; determine, based on the first set of tokens, a first probability that a first class is associated with the first sentence; determine, based on the second set of tokens, a second probability that the first class is associated with the second sentence; identify a first text segment that includes the first sentence and the second sentence based on the first probability, a first timestamp associated with the first sentence, the second probability, and a second timestamp associated with the second sentence; and determine, based on the first text segment, a third probability that the first class is associated with the first text segment.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an erasable programmable read-only memory (EPROM), non-volatile random access memory (NVRAM), parallel random access machine (PRAM), or other such media, or networked versions of such media. Volatile media include, for example, dynamic memory such as dynamic random access memory (DRAM), static random access memory (SRAM), a cache, or other such media. Non-transitory media is distinct from, but can be used in conjunction with transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A computer-implemented method, comprising:

obtaining a first set of tokens associated with a first sentence of a transcript and a second set of tokens associated with a second sentence of the transcript;

determining, by a text classification model and based on the first set of tokens, a first probability that a first class is associated with the first sentence;

determining, by the text classification model and based on the second set of tokens, a second probability that the first class is associated with the second sentence;

identifying a first text segment that includes the first sentence and the second sentence based on:

a comparison of a semantic similarity of the first class associated with the first probability to the first class associated with the second probability; and a comparison of a temporal proximity of a first timestamp associated with the first sentence to a second timestamp associated with the second sentence;

determining a third probability that the first class is associated with the first text segment based on the first set of tokens and the second set of tokens, wherein the third probability is used to adjust a parameter of the text classification model;

determining a label associated with the first text segment based on the third probability;

in response to receiving input indicating a selection of the label, identifying media content corresponding to the first text segment; and providing the media content for presentation.

2. The computer-implemented method of claim 1, wherein the first probability, the second probability, and the third probability are determined by a text classification model comprising a neural network, the method further comprising:

adjusting a parameter of the text classification model based on the third probability.

3. The computer-implemented method of claim 1, further comprising:

storing, with the label associated with the first text segment, a first timestamp associated with the first text segment, wherein the first timestamp is determined based on a second timestamp associated with the first sentence, a third timestamp associated with the second sentence, or both.

4. The computer-implemented method of claim 1, further comprising:

transcribing media content to generate a plurality of sentences including the first sentence and the second sentence;

tokenizing the first sentence to generate the first set of tokens; and tokenizing the second sentence to generate the second set of tokens.

5. The computer-implemented method of claim 1, wherein determining the first probability comprises:

encoding the first sentence into an embeddings vector using the first set of tokens; and determining the first probability based on the embeddings vector.

6. A computer-implemented method, comprising:

generating a first embeddings vector representing semantic content of a first sentence of a transcript and a second embeddings vector representing semantic content of a second sentence of the transcript;

generating an adjusted first embeddings vector based on the first embeddings vector and the second embeddings vector by adjusting the first embeddings vector;

generating an adjusted second embeddings vector based on the first embeddings vector and the second embeddings vector by adjusting the second embeddings vector;

identifying, based on the adjusted first embeddings vector and the adjusted second embeddings vector, a first text segment that includes the first sentence and the second sentence, wherein identifying the first text segment comprises comparing a semantic similarity of a first class associated with the adjusted first embeddings vector and the adjusted second embeddings vector;

determining, based on the first text segment, a probability that the first class is associated with the first text segment;

receiving input indicating a selection of a label;

determining the label is associated with the first text segment based on the probability;

identifying media content corresponding to the first text segment; and providing the media content for presentation.

7. The computer-implemented method of claim 6, further comprising:

transcribing media content to generate a transcript comprising the first sentence and the second sentence.

8. The computer-implemented method of claim 6, wherein the first sentence is associated with a first timestamp and the second sentence is associated with a second timestamp, the method further comprising:

determining a timestamp associated with the first text segment based on the first timestamp, the second timestamp, or both; and storing the label associated with the first text segment with the timestamp associated with the first text segment.

9. The computer-implemented method of claim 6, wherein the first embeddings vector is generated by a first text encoder in parallel with the second embeddings vector being generated by a second text encoder.

10. The computer-implemented method of claim 9, wherein a fusion-layer transformer adjusts the first embeddings vector and the second embeddings vector based on an output of a global attention mechanism executed on the first embeddings vector and the second embeddings vector.

11. A system, comprising:

one or more processing systems; and memory storing instructions that, when executed by the one or more processing systems, cause the system to:

obtain a first set of tokens associated with a first sentence of a transcript and a second set of tokens associated with a second sentence of the transcript;

determine, based on the first set of tokens, a first probability that a first class is associated with the first sentence;

determine, based on the second set of tokens, a second probability that the first class is associated with the second sentence;

identify a first text segment that includes the first sentence and the second sentence based on the first probability, a first timestamp associated with the first sentence, the second probability, and a second timestamp associated with the second sentence; and determine a third probability that the first class is associated with the first text segment based on the first set of tokens and the second set of tokens, wherein the third probability is used to adjust a parameter of a text classification model;

determining a label associated with the first text segment based on the third probability;

in response to receiving input indicating a selection of the label, identifying media content corresponding to the first text segment; and providing the media content for presentation.

12. The system of claim 11, wherein the first probability, the second probability, and the third probability are determined by the text classification model; and wherein the instructions parameter of the text classification model is based on the third probability.

13. The system of claim 11, wherein the instructions further cause the system to:

store, with the label associated with the first text segment, a first timestamp associated with the first text segment, wherein the first timestamp is determined based on a second timestamp associated with the first sentence a third timestamp associated with the second sentence, or both.

14. The system of claim 11, wherein the instructions further cause the system to:

transcribe media content to generate a plurality of sentences including the first sentence and the second sentence;

tokenize the first sentence to generate the first set of tokens; and tokenize the second sentence to generate the second set of tokens.

15. The system of claim 11, wherein determining the first probability comprises:

encoding the first sentence into an embeddings vector using the first set of tokens; and determining the first probability based on the embeddings vector.

16. The system of claim 11, wherein at least one of the first probability or the second probability is determined by the text classification model, wherein the text classification model is a language model trained using a list of predetermined classes.

17. The computer-implemented method of claim 1, wherein the first probability and the second probability are determined by the text classification model; and wherein the first text segment is identified by a text segmentation model.

18. The computer-implemented method of claim 17, wherein the text classification model determines the first class is associated with the first sentence based on determining a probability that the sentence is related to the first class exceeds an absolute threshold.

19. The computer-implemented method of claim 17, wherein the text classification model determines the first class is associated with the first sentence based on determining a first probability that the sentence is related to the first class exceeds a second probability that the sentence is related to a second class.

20. The computer-implemented method of claim 17, wherein the text classification model is a language model trained using a list of predetermined classes.

* * * * *